(12) United States Patent
Malmberg

(10) Patent No.: US 7,908,735 B2
(45) Date of Patent: Mar. 22, 2011

(54) METHOD AND INSTALLATION MEANS FOR INSTALLING AN ELECTRICAL MACHINE

(75) Inventor: Jukka Malmberg, Helsinki (FI)

(73) Assignee: ABB Oy, Helsinki (FI)

( * ) Notice: Subject to any disclaimer, the term of this patent is extended or adjusted under 35 U.S.C. 154(b) by 516 days.

(21) Appl. No.: 11/597,753

(22) PCT Filed: May 31, 2005

(86) PCT No.: PCT/FI2005/000248
§ 371 (c)(1),
(2), (4) Date: Dec. 14, 2006

(87) PCT Pub. No.: WO2005/117242
PCT Pub. Date: Dec. 8, 2005

(65) Prior Publication Data
US 2008/0016674 A1    Jan. 24, 2008

(30) Foreign Application Priority Data
May 31, 2004  (FI) ............................ 20040745

(51) Int. Cl.
*H02K 15/00* (2006.01)
(52) U.S. Cl. ............... 29/596; 29/423; 29/732; 310/90; 310/156.29
(58) Field of Classification Search .............. 29/596, 29/598, 607, 732, 737, 738, 423; 310/156.48–156.61, 156.08–156.19, 51, 310/90, 156.29, 156.47, 156.55, 156.136
See application file for complete search history.

(56) References Cited

U.S. PATENT DOCUMENTS

| | | | |
|---|---|---|---|
| 3,165,816 A | | 1/1965 | Thompson et al. |
| 3,176,380 A | * | 4/1965 | Wightman ...................... 29/596 |
| 3,719,988 A | | 3/1973 | Nielsen |
| 3,755,889 A | | 9/1973 | Busian |
| 3,857,170 A | * | 12/1974 | Stoner ............................. 29/596 |
| 4,031,610 A | * | 6/1977 | Singh et al. .................... 29/598 |
| 4,164,722 A | * | 8/1979 | Garvey ......................... 335/272 |
| 4,480,378 A | * | 11/1984 | White et al. .................... 29/596 |
| 4,574,840 A | * | 3/1986 | Schumann et al. ...... 137/625.15 |

(Continued)

FOREIGN PATENT DOCUMENTS
EP    0 993 100 A2    4/2000

(Continued)

OTHER PUBLICATIONS
International Search Report dated Oct. 21, 2005 of PCT/FI20040745.

(Continued)

*Primary Examiner* — Thiem Phan
(74) *Attorney, Agent, or Firm* — Buchanan Ingersoll & Rooney PC

(57) ABSTRACT

The object of the invention is a method and installation means for installing an electrical machine, particularly for installing a rotor within a stator. According to the invention, two or more spacer elements (32) are fitted on the outer circumference of the rotor (6), the distance between the outermost part of these spacer elements and the rotor's central axis of rotation (7) being smaller than the inner radius of the stator (2) and greater than the outer radius of the rotor (6), and the rotor is inserted into the stator in the direction (S) of its shaft.

9 Claims, 2 Drawing Sheets

U.S. PATENT DOCUMENTS

Figure 1:
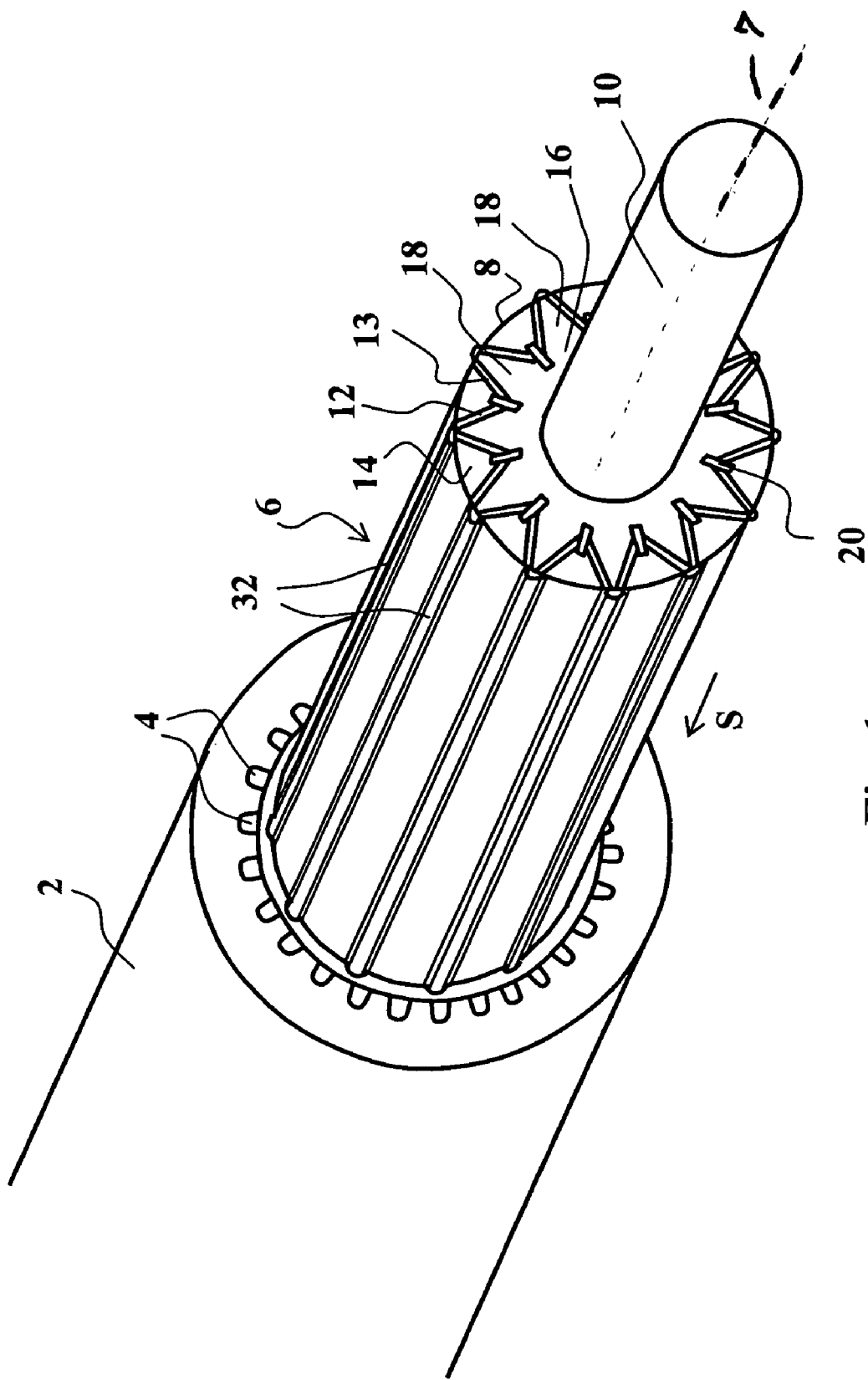

| | | | |
|---|---|---|---|
| 4,590,668 A | 5/1986 | Peachee, Jr. | |
| 4,682,066 A | 7/1987 | Abbratozzato et al. | |
| 5,056,213 A * | 10/1991 | Behnke et al. | 29/596 |
| 5,345,669 A * | 9/1994 | Zigler et al. | 29/598 |
| 6,236,134 B1 * | 5/2001 | Syverson | 310/181 |
| 6,889,419 B2 * | 5/2005 | Reiter et al. | 29/596 |
| 6,984,908 B2 * | 1/2006 | Rinholm et al. | 310/156.08 |
| 7,148,598 B2 * | 12/2006 | Ionel et al. | 310/156.55 |
| 2002/0047327 A1 | 4/2002 | Ganser | |
| 2005/0017590 A1 * | 1/2005 | Ionel et al. | 310/156.47 |

FOREIGN PATENT DOCUMENTS

| | | |
|---|---|---|
| GB | 2 005 925 A | 4/1979 |
| JP | 57059462 | 4/1982 |
| JP | 09172757 | 6/1997 |
| JP | 10066312 | 3/1998 |
| WO | 2004/001932 A1 | 12/2003 |

OTHER PUBLICATIONS

Finnish Search Report.

* cited by examiner

METHOD AND INSTALLATION MEANS FOR INSTALLING AN ELECTRICAL MACHINE

The object of the invention is a method for installing an electrical machine, and an installation means for installing the rotor of an electrical machine.

In cylindrical electrical machines, the rotor is normally installed inside the stator where it rotates around its shaft supported by bearings arranged in the stator body. When manufacturing the electrical machine, the rotor and stator body structures with windings are completed separately. After this, the rotor is fitted inside the stator where it rotates at the distance of an air gap from the stator, supported by bearings. In relation to the other dimensions of the electrical machine, the air gap is fairly small, for example 0.5 to 10 mm depending on the type of machine. Because the rotor is not yet mechanically connected to the stator body at the time of installation, support for the rotor must be arranged in some other way. When large machines are being manufactured, this naturally requires special measures.

The purpose of the invention is to solve the problem described above and allow for the easier, simpler and more secure installation of a rotor. Other preferred embodiments of the invention are characterised by the features listed in the dependent claims.

The purpose of the invention is to solve the problem described above and allow for the easier, simpler and more secure installation of a rotor. In order to achieve this, the method according to the invention is characterised by the features specified in the characteristics section of Claim 1. Correspondingly, the installation means required for implementing the invention is characterised by the features specified in the characteristics section of Claim 6. Other preferred embodiments of the invention are characterised by the features listed in the dependent claims.

The solution, according to the invention, provides for the secure and reliable isolation of the rotor from the stator's inner surface for the entire duration of the installation into the stator. Under no circumstances can the rotor contact the inner surface of the stator.

According to a preferred embodiment of the invention, the spacer element used as an installation means is integrated into the rotor structure. No separate stages of detaching, attaching and adjusting the spacer element are required.

According to a preferred embodiment of the invention, the spacer elements between the rotor and stator are removed after installation. In this case, the surface of the rotor's outer circumference is identical to that of a rotor not employing the solution according to the invention. If the rotor needs to be removed in connection with maintenance or repair, or if it has to be reliably supported during bearing replacement, the spacer elements can be refitted to the rotor for the duration of the work. Particularly in this case, the spacer elements can be dimensioned to exactly fit the air gap so that there will only be the clearance required for longitudinal movement of the rotor on the surface of the spacer element facing the stator.

According to a preferred embodiment of the invention, the spacer element is made from non-magnetic material. The spacer element itself cannot seize to the stator surface.

One preferred embodiment includes arrangements for fastening the spacer element to a radial permanent magnet closing element. There is no need to treat or modify the rotor body structure or sheet pack in any way; a suitable construction of the closing element provides a well-functioning result.

Figure 2:
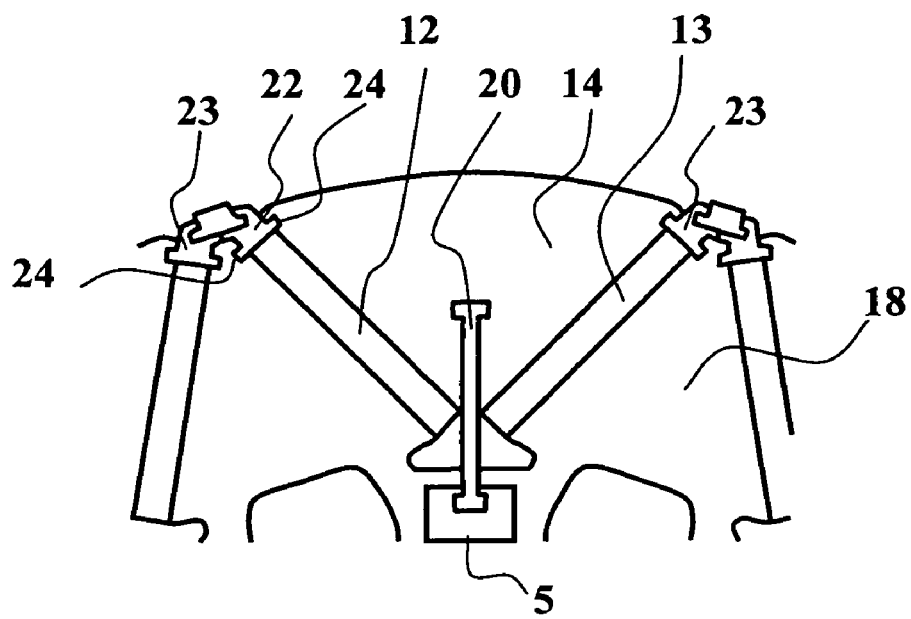
Figure 3:
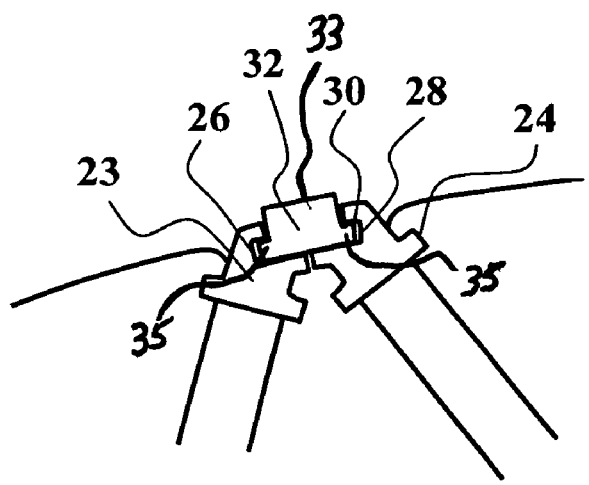

The invention will be described in detail with the help of a certain embodiment by referring to the enclosed drawings, where FIG. 1 illustrates the fitting of a rotor to a stator according to the invention, FIG. 2 illustrates the detail of the solution according to the invention, and FIG. 3 illustrates an enlarged view of the detail in FIG. 2.

The stator of an electrical machine comprises a stator body (not shown) to which the stator sheet pack 2 (FIG. 1) has been fitted. The inner circumference of the sheet pack has grooves 4 for stator windings (not shown). The rotor 6 comprises the rotor sheet pack 8 attached to the machine's shaft 10. The dashed line 7 represents the central axis of the rotor's revolution. The present electrical machine is a permanent magnet synchronous machine with grooves for permanent magnets 12 and 13 in the rotor sheet pack. The permanent magnets 12 are installed in a V arrangement so that a pole element 14 forming a rotor pole remains between magnet 12 and magnet 13. The pole element is made from the sheet pack and its cross section is essentially triangular. A tooth 18 belonging to the central section 16 of the rotor sheet pack remains between adjacent poles, extending essentially close to the outer circumference of the rotor. The central section 16 of the rotor pack is attached to the machine's shaft 10, and the pole sections 14 of the rotor are attached to the central section 16 by fastening elements 20.

The permanent magnet closing elements 22 and, correspondingly, 23 (FIG. 2) are fitted to the ends of the permanent magnets 12 and 13 facing the outer circumference of the rotor, installed in grooves 4 made in the pole element 14 and the central section's tooth 18. The closing elements 22 and 23 prevent radial movement of the permanent magnets towards the machine's air gap. A cavity 26 is formed in the edge 24 of the closing element 22 facing the air gap, and a cavity 28 is formed at the corresponding position in the closing element 24. When the closing elements 23 and 24 are fitted in place, the cavities 26 and 28 together form a slot 30 for placing the projections 35 of the spacer element 32 when installing the spacer element 32 in place axially from the end of the rotor. The outermost edge 33 of the spacer element facing away from the rotor forms a support surface that corresponds to the stator when the rotor deviates from its middle position. The closing elements 23 and 24, as well as the spacer elements, are essentially long rods or strips extending to the entire length of the rotor. Depending on the construction and implementation, they can also comprise several parts fitted sequentially to the rotor. Even though the examples in FIGS. 2 and 3 present the closing elements and spacer elements as separate parts that form a structure providing the function according to the invention when combined, the closing element for two magnets "lying against each other" can be formed from a single part—that is, the closing elements 23 and 24 in the illustrated example are a single entity. Similarly the spacer element can be integral to the closing elements or only one of them. Such variations belong to the scope of the invention even though they may not be able to compete with the embodiment illustrated in FIGS. 2 and 3 in all circumstances.

The purpose of the spacer element, according to the invention, is to prevent the outer surface of the rotor's iron parts from contacting the inner surface of the stator when the rotor is being installed. As illustrated in FIG. 1, the rotor is pushed into the stator in the direction of arrow S while being appropriately supported by its outer circumference and shaft. The dimensioning of the spacer elements in the radial direction of the machine's rotor and stator is such that the distance between the spacer element's support surface 36 facing the stator and the machine's central axis of rotation is less than the radius of the stator's inner circumference and greater than the outer radius of the rotor sheet pack. The number of spacer elements is not bound to the number of magnetic poles but may deviate from it provided that the function according to the invention is realised. The spacer elements can contact the inner surface of the stator during installation and are thus preferably made from a material that does not damage the stator sheet pack and is also non-magnetic, so that the attractive force of the rotor's permanent magnets will not be imposed on the stator sheet pack in a point-type or line-type pattern. The machine's bearings are fitted to the stator's end plates and correspondingly to the rotor shaft using a well-known method. Once the rotor has been fitted into place, the end plates and bearing housings are attached using a well-known method. The spacer elements may remain attached to the rotor during machine operation, in which case they can preferably be integrated with the rotor structure. Alternatively, the spacer elements are detachable, and the removed spacer elements will be reinstalled if the rotor needs to be removed for maintenance or repair. The spacer elements can also be used to help the alignment of the rotor in relation to the stator, particularly if the distance between the spacer element and stator is very small.

The examples in the figures present an embodiment of the invention in connection with a permanent-magnet rotor, particularly a rotor where the permanent magnets are fitted to the rotor in a V arrangement. The spacer elements are preferably installed to the permanent magnet closing elements. According to alternative embodiments of the invention, the spacer elements can also be installed in some other groove on the outer circumference of the rotor that is arranged, for example, in the shape of a slot described above or a corresponding shape such as a dovetail. Such a solution could be applicable, for example, in the case of permanent magnets embedded into the rotor. Furthermore, the spacer elements can be attached directly onto the rotor surface if it is not desirable or possible to break the smooth outer surface of the rotor, and the spacer element rods can be attached to the rotor ends, for example. Such a solution is primarily applicable to an installation-time case in which the spacer elements are removed after the rotor is installed into place.

An installation strip according to the invention is also applicable to other types of permanent-magnet machines besides the one with V magnets described above. When using vertical magnets that are essentially radial in direction, the installation strip can be within the magnet locking strip. When using surface magnet elements, for example, there is an aluminium wedge between the magnet modules, and the installation strip can be installed to this.

In the above, the invention has been described with the help of certain embodiments. However, the scope of patent protection should not be considered as limited to the above description; it may vary within the scope of the following claims.

The invention claimed is:

1. A method for installing a rotor within a stator of an electrical machine, comprising:
   attaching plural spacer elements to an outer circumference of the rotor; and
   inserting the rotor with the attached spacer elements into the stator in the direction of a rotor shaft,
   wherein the spacer elements are arranged between the stator and the rotor, the distance between an outermost part of these spacer elements and a central axis of rotor rotation being smaller than an inner radius of the stator and greater than an outer radius of the rotor, and
   wherein the spacer elements are fitted to closing plates securing the radial attachment of a permanent magnet.

2. The method according to claim 1, wherein spacer elements are removed once the rotor is in place.

3. The method according to claim 2, wherein the spacer elements are refitted when the rotor is removed in connection with maintenance.

4. The method according to claim 1, wherein the spacer elements are fitted to a groove on the outer circumference of the rotor.

5. An installation means for installing a rotor of an electrical machine, the rotor being arranged on a shaft and, in a completed machine, essentially inside the stator, the installation means comprising:
   a spacer element that includes a rod essentially axial to the machine;
   said spacer element having a support surface that faces the stator and an attachment element that faces the rotor and attaches the spacer element onto an outer circumference of the rotor,
   wherein the spacer element is configured to be attachable to closing plates securing a radial attachment of a permanent magnet.

6. The installation means according to claim 5, wherein the spacer element is integrated into the rotor structure.

7. The installation means according to claim 5, wherein the spacer element configured to be detachable from the rotor after installation.

8. The installation means according to claim 5, wherein the spacer element is configured to be attachable to a groove arranged on an outer circumference of the rotor.

9. The installation means according to claim 5, wherein the spacer element is made from non-magnetic material.

* * * * *